United States Patent [19]

Skatrud et al.

[11] Patent Number: 4,633,468

[45] Date of Patent: Dec. 30, 1986

[54] DETECTING AND RECOVERING FROM FAULT CONDITION IN A SERIAL LOOP DATA TRANSMISSION SYSTEM

[75] Inventors: Ralph O. Skatrud, Raleigh, N.C.; Chester L. Storm, Hillsville, Va.

[73] Assignee: International Business Machines Corp., Armonk, N.Y.

[21] Appl. No.: 650,489

[22] Filed: Sep. 14, 1984

[51] Int. Cl.⁴ ............................................. G06F 11/20
[52] U.S. Cl. ........................................ 371/22; 371/11
[58] Field of Search .................. 371/11, 9, 22, 10, 24; 364/200, 900

[56] References Cited

U.S. PATENT DOCUMENTS

| | | | |
|---|---|---|---|
| 4,186,380 | 1/1980 | Edwin | 371/11 |
| 4,347,564 | 8/1982 | Sugino | 371/9 |
| 4,354,267 | 10/1982 | Mori | 371/11 |
| 4,374,436 | 2/1983 | Armstrong | 371/11 |
| 4,468,738 | 8/1984 | Hansen | 371/9 |
| 4,495,595 | 1/1985 | Nakayashiki | 364/900 |
| 4,498,082 | 2/1985 | Aldridge | 371/11 |
| 4,500,951 | 2/1985 | Sugimoto | 371/9 |
| 4,527,235 | 7/1985 | Chebra | 371/9 |
| 4,575,847 | 3/1986 | Fallwell | 371/22 |

Primary Examiner—Michael R. Fleming
Attorney, Agent, or Firm—Joscelyn G. Cockburn

[57] ABSTRACT

Terminals in a serial loop communication system monitor the loop to detect a unique polling message. Failure to detect the polling message forces the terminals into an error checking routine. The routine quiesces (i.e., forces most of the stations into a quiet state) the loop with only one active station issuing a beacon message. The active station monitors the loop and when the beacon message is detected, the station issues an error message signifying that the controller is down. The error message is used to activate a backup controller. The error routine further identifies a break or other defect in the loop if its own beacon message or any other beacon message (or a poll) is not received.

10 Claims, 5 Drawing Figures

FIG. 2

| GENERAL FORMAT | START DE-LIMITER | ADDRESS FIELD | IDENTIFIER FIELD | BLOCK CHECKING CHARACTER FIELD (BCC) | END DE-LIMITER |
|---|---|---|---|---|---|

| POLL | 7E | FF | 23 | $CRC_1, CRC_2$ | 7E |
|---|---|---|---|---|---|

| BEACON | 7E | TERMINAL ADDR | FF | $CRC_1, CRC_2$ | 7E |
|---|---|---|---|---|---|

| CONTROLLER DOWN | 7E | FB | FF | $CRC_1, CRC_2$ | 7E |
|---|---|---|---|---|---|

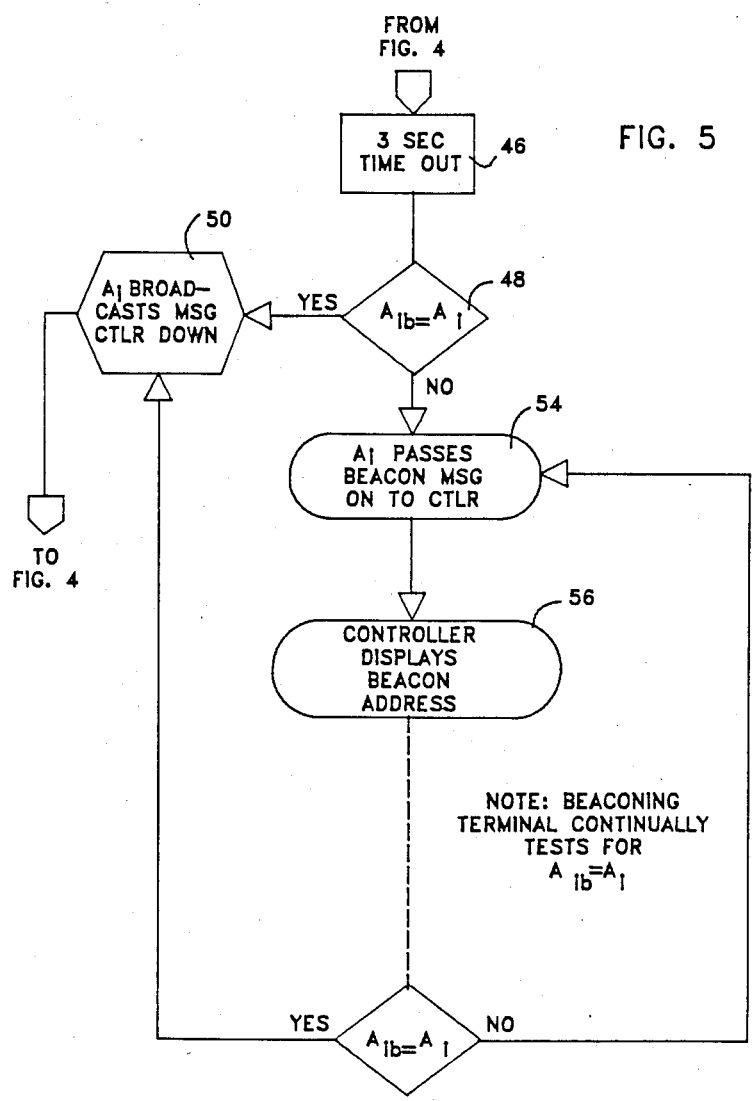

DETECTING AND RECOVERING FROM FAULT CONDITION IN A SERIAL LOOP DATA TRANSMISSION SYSTEM

BACKGROUND OF THE INVENTION

(1) Field of the Invention

The present invention relates to serial loop data communications systems in general and more particularly to means for precisely locating transmission faults in the communication system.

(2) Prior Art

Serial loop data transmission systems are extremely efficient for connecting large numbers of data terminal equipments (DTE) which are widely scattered with distances between terminals being generally insignificant to the distances between the central controller and the more remote terminals. Because of its efficiency, the serial loop data transmission systems are popular in private communication systems such as local area network, banking systems, retail and supermarket systems, etc.

The basic system consists of a communicating medium configured into a ring and a plurality of terminals, including a controller, tapping into the ring. U.S. Pat. No. 4,195,351 is an example of such a loop configured data transmission system. In such a configuration a break in the medium and/or a defect in the controller can bring the entire system to a screeching halt.

In order to improve the system's reliability the prior art has provided several techniques and/or devices which minimize complete loss of the system when an error condition occurs. For example, one prior art system utilizes a pair of loops to achieve true full duplex operation. In the event that one loop develops a fault, the other loop may be operated in a half duplex mode to enable communications on a limited basis while the fault is fixed.

Other prior art techniques and devices strive to detect and correct error conditions on the loop. U.S. Pat. Nos. 3,564,145 and 4,006,456 are examples of prior art devices which detect fault conditions in a loop communication network.

In U.S. Pat. No. 3,564,145 terminals connected to a loop data transmission system automatically monitor input data to detect no data and mutilated data conditions. When either condition is detected, signals including the unique terminal address are automatically generated. The generated signals satisfy all downstream terminals and the central controller within a predetermined time is provided with the address of the terminal immediately following the fault and an indication of the type of fault.

In addition, U.S. Pat. No. 4,006,456 provides a simplified loop communication fault location and isolation circuit which uses sequences of power interruption pulses in DC power distributed on the signal lines from a master repeater to control the loop signal wrap functions.

SUMMARY OF THE INVENTION

It is therefore the main object of the present invention to provide a unique technique and apparatus for automatically locating and identifying fault conditions on a loop data communication network.

The unique technique quiesces the loop by allowing only the DTE with the largest address to continue beaconing until the station sees its own address in a return beaconing message. This defines a good loop and bad controller. Also covered is the situation in which the loop is down and the controller is good. The surviving beaconing DTE identifies the broken segment.

The loop data communication network includes two controllers. One of the controllers (called the primary controller) is used to control the loop. A backup controller (called a secondary controller) runs in a backup mode and can be activated to take over control of the loop in the event that the primary controller fails. A unique address ($A_1$ through $A_N$) is assigned to each DTE on the loop. Communication between the active controller and the terminals is effectuated by the controller generating and circulating a poll message on the loop.

If the poll message is not detected, each DTE enters into an error checking routine. First, the DTE performs a wrap test on itself. The test is to ensure that the DTE is not defective. Depending on the outcome of the test, if the station is defective, it disconnects from the loop. If the DTE is not defective, a beacon message is issued.

Initially, each DTE sees the beacon message from the proceding upstream DTE. Each terminal compares the address in the receive beacon message with its unique address. If its address is less than the address in the incoming beacon message, the station stops beaconing and forwards the received beacon message with the higher address. The process is repeated by each downstream DTE on the loop until the DTE with the highest address is the only beaconing DTE. As soon as the beaconing message is received by the beaconing DTE, it issues a "Controller Down" message which can be used to enable the secondary controller or if no secondary controller is present, all terminals can display the controller down message.

In order to isolate a defective loop, each DTE is allowed to beacon for a predetermined period of time. If at the end of the period the station does not receive the originally generated beaconing message, the station discontinues its own beaconing and passes on the received beacon message. After a while, only the DTE which cannot receive an incoming beacon message is beaconing. The address of the beaconing DTE identifies the defective segment in the loop.

In one feature of the invention the technique provides for automatic recovery even if a controller is manually removed from the loop.

The foregoing and other features and advantages of this invention will be more fully described in the accompanying drawings.

DESCRIPTION OF THE DRAWINGS

FIG. 2 shows diagrammatic representation of frames utilized to identify faults in the communication system of FIG. 1.

FIGS. 4 and 5 are flow charts of the process step used in identifying a defective communications system according to the teaching of the present invention.

DESCRIPTION OF THE PREFERRED EMBODIMENT

Figure 1:
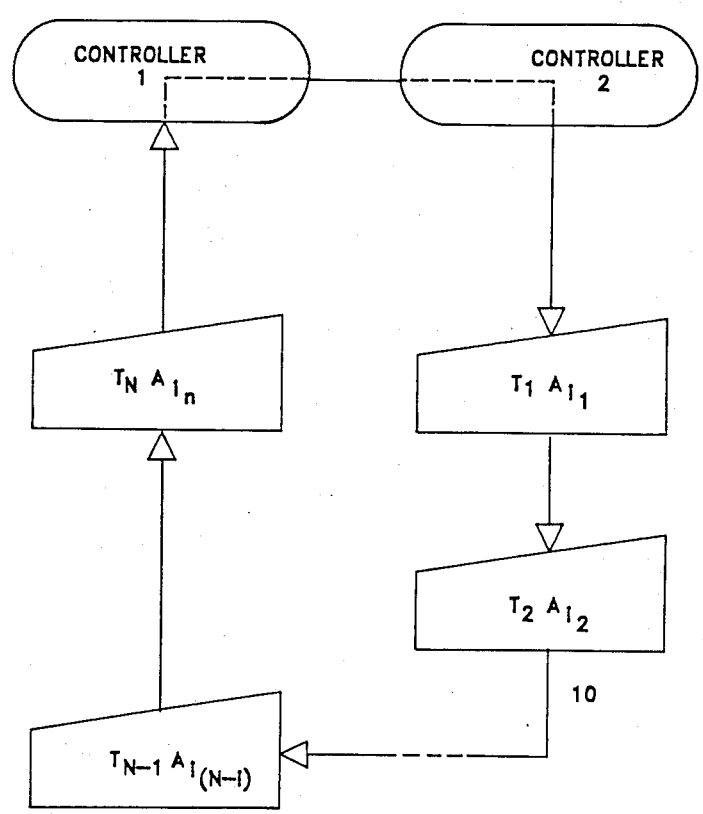
FIG. 1 is a block diagram of a communication system according to the teaching of the present invention.

FIG. 1 shows a typical loop configuration system according to the teaching of the present invention. The system includes a communication medium identified by numeral 10. The communication medium may be a conventional twisted pair of conducting wires or any suitable type of electrical conductor. A plurality of terminals identified by alphanumeric characters $T_1A_{i1}$ through $T_nA_{in}$ are serially connected to the communication medium. Each terminal has its address, A(i) assigned to it on the loop. The $A_i$ address which is assigned to each terminal is unique for that particular terminal. This being the case, if there are N terminals on the loop, there will be N unique $A_i$ addresses. With this designation one terminal must have the largest address and another terminal must have the smallest address. Stated another way, the terminals are arranged in sequential order on the loop. If one views the station on the loop in the direction of signal transmission (shown by the arrows in the figure), terminal $T_1A_{i1}$ is a low order address terminal while terminal $T_nA_{in}$ represents the high order address terminal.

Two controllers identified as controller 1 and controller 2, respectively, are sequentially connected to the loop. As will be explained subsequently, one of these controllers functions as a primary controller which controls stations on the loop. The other controller acts as a backup controller. If the primary controller goes down (that is, becomes inoperable), then the backup controller is activated (as the controller) and assumes the control function which was previously undertaken by the primary controller.

Whenever one of the controllers is running in the backup mode, it operates as if it were one of the terminals. As will be explained subsequently, each of these controllers has the capability of de-inserting itself from the loop and signals on the loop are fed through the controller. This feature is shown by the broken line through each of the controllers. Although not shown in FIG. 1, each terminal is also capable of de-inserting itself from the loop and as a result the signals on the loop bypass the de-inserted terminal. This bypass feature enhances the availability of the system since a defective terminal and/or controller does not render the entire system inoperative.

Figure 3:
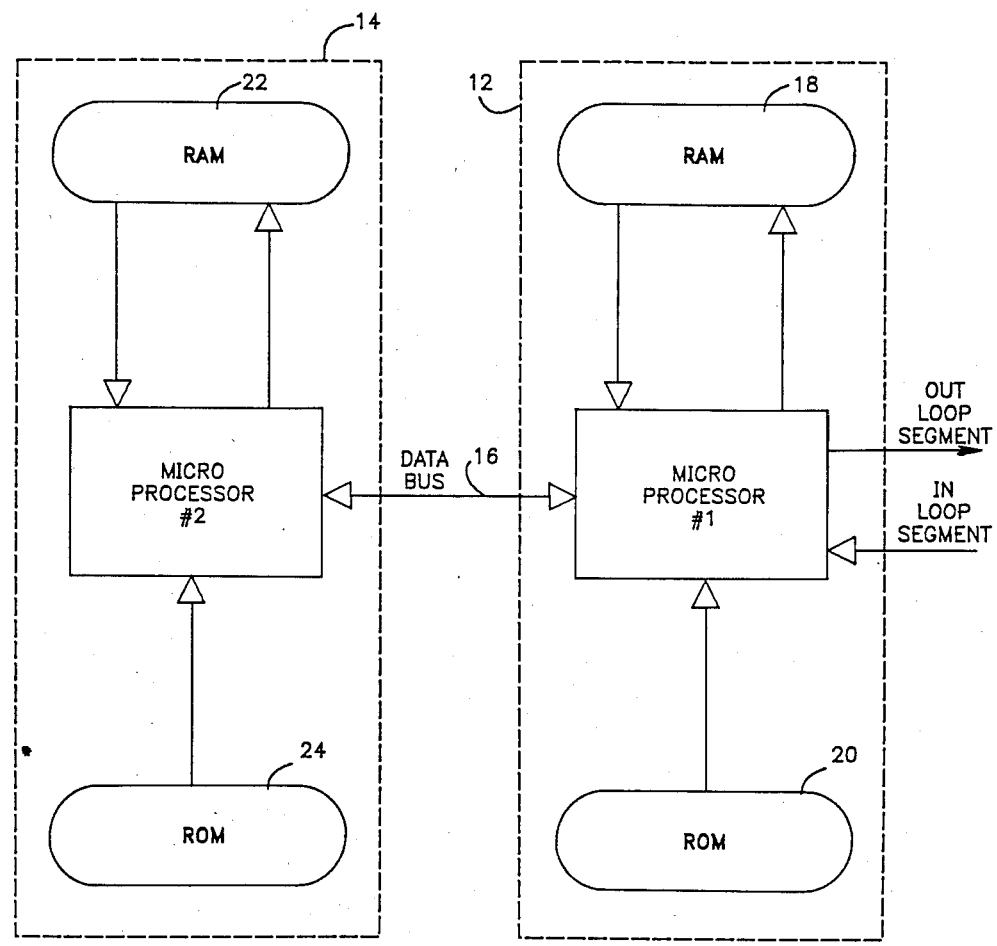
FIG. 3 is a block diagram showing the essential components of a DTE.

FIG. 3 shows a block diagram of the essential components a data terminal equipment (DTE) which is connected to the loop. Each DTE comprises of a loop adapter 12 and a terminal microprocessor 14. The loop adapter 12 is connected to the communication medium 10 (FIG. 1) by input and output loop segments. The adapter is also connected via data bus 16 to the terminal microprocessor 14. The loop adapter 12 includes a microprocessor module 1 connected to a random access memory 18 and a read-only memory (ROM) 20. The ROM contains a stored control program while the RAM is used for scratch pad and other types of conventional processing functions. The main function of the loop adapter is to receive and process messages going out on the loop and messages coming in from the loop. On receiving messages from the loop, the adapter assembles the message, deserializes the message, notifies the terminal microprocessor of the message and then transfers the message to the terminal microprocessor for further processing. Likewise, on transmitting a message onto the loop, the adapter performs the CRC check, serializes the message and transmits each character onto the loop.

The terminal microprocessor 14 comprises of a microprocessor module identified by number 2 which is connected to a RAM 22 and ROM 24. The random access memory 22 is used as a working memory of the terminal microprocessor while the ROM 24 contains stored control programs. The function of the terminal microprocessor is to control the operation of stations on the loop. To this end, the terminal microprocessor controls the transmission of messages on the loop. In the controller, a controller microprocessor similar to the terminal microprocessor initiates and transmits the poll message (to be explained subsequently). Furthermore, the terminal microprocessor 14, be it in a controller or terminal, performs the following functions: identifies beacon messages (to be described subsequently), compares the station addresses in the beacon message with the station address, determines when to beacon, determines what beacon message to send, identifies data messages, determines when and if to poll, etc.

It should be noted that FIG. 3 provides only the minimum number of components which are needed to understand the present invention. In reality, a DTE (be it a terminal and/or controller) includes a much larger number of components. However, those additional components are not needed to understand and/or practice the present invention and are therefore omitted to simplify the description.

Referring now to FIG. 2, the formats for the messages which are generated and transmitted on the loop of FIG. 1 are shown. The format is a sub-set of the well-known SDLC (Synchronous Data Link Communication) protocol used and created by the IBM Corporation. Referring to the graphical representation, from the top of the page towards the bottom, the first sketch shows a general format for messages on the loop. The format comprises of a start delimiter field, an address field, an identifier field, a block checking character field, and an end delimiter field. The start delimiter is used to identify the beginning of the message. The address field represents either the address of the station to which the message is sent or the address of the station sending the message. The address placed in the address field depends on the type of message. The identifier field indicates the type of message. The block checking character field is usually two bytes long and represents the CRC data which is generated by the station initiating the message and is transmitted along with the message. The end delimiter field indicates the end of the message.

The second sketch of FIG. 2 identifies the format for the poll message. The poll message is a unique message which is generated by the controller which is in control of the loop. This message allows stations on the loop to communicate (i.e., send and/or receive a message from) with the controller. In the preferred embodiment of this invention the poll message is identified by the alphanumeric characters shown in each of the fields of the general format. Of course, other types of characters can be defined and used without departing from the scope of the present invention. In the embodiment, the start delimiter, address field, identifier field, and the end delimiter are in hexadecimal notation. The block checking field will be dependent on the content of the address field and the identifier field and will follow the prescribed algorithm for generating the CRC data. The prescribed algorithm is the SDLC documented method of generating CRC characters.

The third graphical representation in FIG. 2 represents the so-called beacon message. The beacon is a special type of message which is initiated when the station does not receive the poll message within a predetermined period of time. The basic structure of the message is the same as the general format. As with the poll message (previously described), the preferred alphanumeric characters which are used in the present invention are shown in the graphical representation. Of course, other types of characters may be used without departing from the scope of the present invention. In the beacon message the terminal address would be the address of the terminal issuing the beacon.

Finally, the last message format of FIG. 2 represents a specific message identified as controller down. As will be explained subsequently, this message is issued by the terminal which identifies that a controller is down. The alphanumeric characters which are used in this message (in the preferred embodiment of this invention) are shown in FIG. 2. As before, it is within the skill of the art to use other alphanumeric characters without departing from the scope of the present invention. It should be noted that "FB" in the address field of the message identifies the fact that the terminal sensed its own address on the beacon preceding this message and changed its address to "FB" in the beacon message to indicate that the controller is down (and the loop is functional). This message will be repeated until a poll is seen on the loop by this terminal. This signifies recovery of system function.

Having described the improved communications system and the messages which are used to allow isolation and recovery of controller problems on the loop, a flow chart of the technique used in identifying the fault will now be described. Usually there are two types of fault occurring on a system such as the one described in FIG. 1. In the first instant the primary controller is down. In the second instant the loop is defective at some point. The technique of the present invention identifies and corrects or flags any of these types of loop problems. While many of the problems can be recovered from automatically, a few must be recovered from manually. The flag gives the information necessary to allow the correct manual recovery process.

Figure 4:
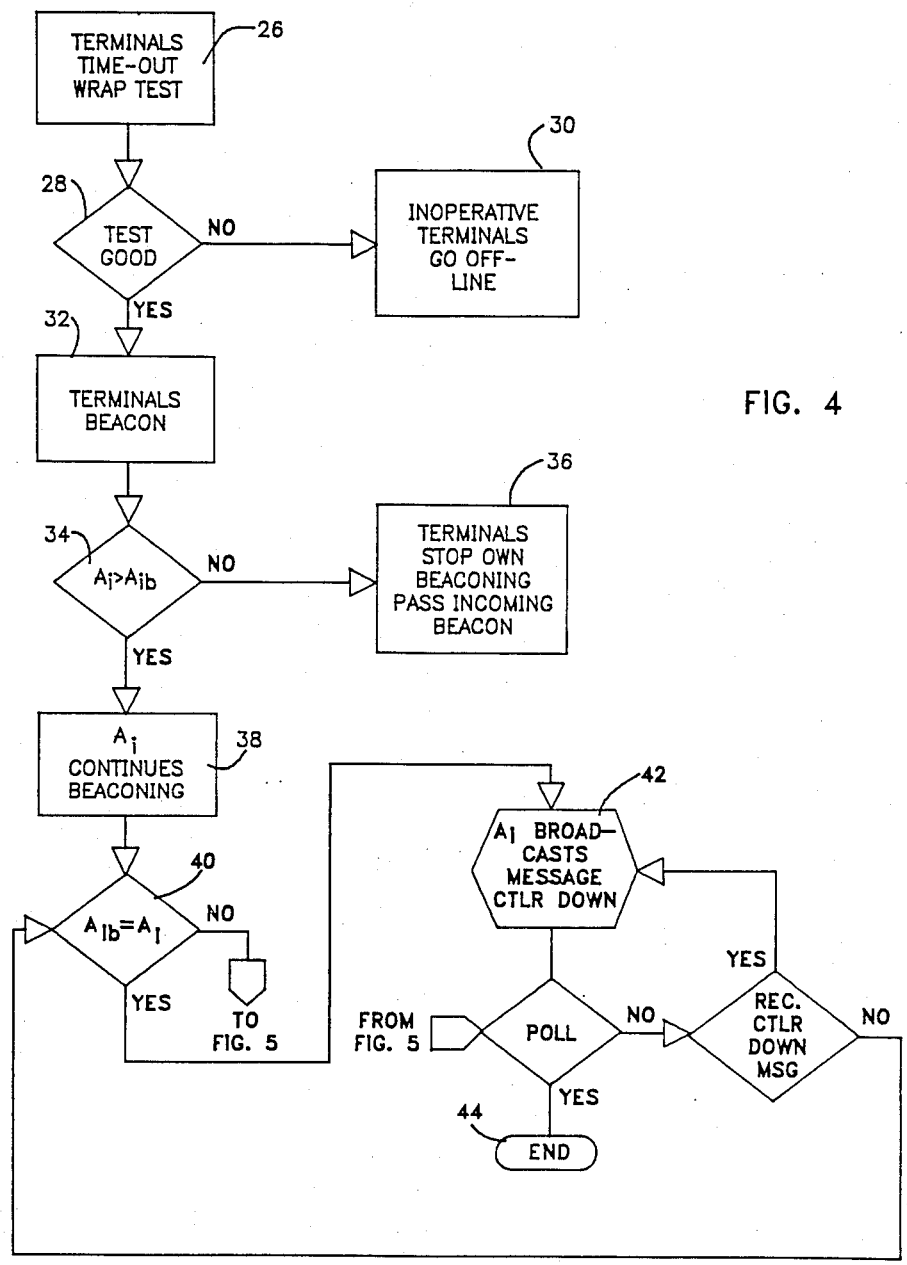

The flow chart in FIG. 4 shows a technique which is followed to identify a down (i.e., defective) controller. The first step in the program is shown in functional block 26. In order to initiate operation of the loop, the primary controller generates the poll message and transmits it on the loop. As a result of this poll message, each active station on the loop generates and transmits (that is, appends its message onto the poll). If the station on the loop does not see a poll for a predetermined period of time, the terminal goes into a conventional wrap test. The wrap test enables a terminal to check itself and to make sure that the terminal is in an operative condition.

Once the wrap test is completed, the program descends into block 28. In block 28 the program checks to see the result of the test. If the test is not good, the program enters block 30 where the terminal goes off line (that is, de-inserts itself from the loop). As stated previously, a terminal can de-insert itself from the loop and via its relay or other bypass means electrical signals can pass through the terminal thus preventing the disruption of communication on the loop. If the test result indicates that the terminal is good, the program descends into block 32. In block 32 the terminal prepares and transmits the previously described beacon message onto the loop. From block 32 the program drops into decisional block 34. In block 34 the program checks to see if the incoming address ($A_i$) is greater than $A_{ib}$ (where $A_{ib}$ represents the address of the station). If the incoming address is larger than the address of the station, the program enters into block 36. In block 36 the terminal stops its own beaconing and forwards the incoming beacon with the larger (i.e., high order) address.

If the incoming address $A_i$ was less than the address of the beaconing station ($A_{ib}$), the station descends into block 38 where it continues its beaconing and its own address $A_{ib}$ is transmitted in the message. The program then descends into block 40. In block 40 the station checks to see if the incoming beacon $A_{ib}$ is equal to its own address $A_{ib}$. If it is, the program descends into block 42. With the address being the same, the station is alerted that the controller is down. The program then prepares the controller down message, and transmits the same on the loop. It continues to transmit the controller down message as long as it receives the controller down message from the loop. If it sees a "poll," it signifies system recovery. The processor exits the routine (block 44) and resumes normal operation.

With reference to FIGS. 4 and 5, if the $A_{ib}$ address was not equal to the $A_i$ (address block 40, FIG. 4), the program then enters block 46 (FIG. 5). In block 46 the program enters into a three second timeout delay. At the end of this delay the program then descends into block 48 where it checks to see if $A_{ib}$ (incoming address in beacon message) is equal to $A_i$ (address of station). If $A_{ib}$ is equal to $A_i$, then the program enters block 50 where $A_i$ broadcasts the controller (Ctlr) down message (Msg) and exits to FIG. 4 on the preceding figure.

If at the end of the timeout $A_{ib}$ is not equal to $A_i$, the program descends into block 54. In block 54 the station stops its own beaconing and passes the beacon message onto the controller. The program then descends into block 56 where the controller displays the beacon address. Thereafter the beaconing terminal continues to test if the incoming address ($A_{ib}$) is equal to its own address $A_i$. The program then loops until an operator observing the displayed error message takes appropriate action. Of course, the display terminal's address indicates the segment in the loop that is broken or otherwise damaged.

Operation

In order to describe the operation of the present invention, let us assume that the controller is down (that is, is not operational). The terminals $T_1A_{i1}$ through $T_nA_{in}$ (FIG. 1) and the backup controller 2, when they come up, will not see the poll message. Failure to see the poll message forces the terminal and the backup controller to timeout and to do a wrap test (Block 26, FIG. 4). Any terminal or terminals which cannot successfully perform the wrap test on their loop circuitry will remove themselves from the loop. All the remaining terminals will issue the previously described beacon message. Initially, each terminal sees the beacon message from its upstream active neighbor. The station compares the beacon address and its own address. If its address A(i) is less than A(i)b, the beaconing address coming in, the station will stop its beacon and pass on the beacon with the higher A(i)b address. Finally, the terminal with the highest A(i) address is the only beaconing terminal. If it is the only beaconing terminal, the station will see its address come back. At this point, it knows the controller is down and is bypassed. The station then broadcasts a message to all terminals saying "The controller is down."

If one of the terminals, $T_{(n)}$, is the sleeping or backup controller, it will see the message, interpret it and automatically, under program control, switch to the prime control function and at the same time display a message saying the prime controller is down so that service can be requested on the former prime controller. It should be noted that although the loop is quiesced so that the station with the highest order address performs the beaconing function, this can also be done by allowing the station with the lowest address to perform the beacon function for "controller down." Of course, it is within the skill of the art to quiesce the loop by using some other unique characteristics of the stations without departing from the scope or spirit of the present invention.

Now let us assume that the controller was not down, but that the loop was interrupted or broken. When the high order address beaconing terminal $A_i$ does not see its beacon, $A(i)b = A(i)$, the $A(i)$ terminal that was also beaconing and receiving the beacon will stop beaconing and send out the $A(i)b$ incoming beacon. The beacon goes on the loop and ultimately to the controller. Since all terminals receiving beacons will stop beaconing themselves and pass on the original received beacon, the only terminal left beaconing is the one not receiving a beacon. This then marks the bad segment in the loop if the controller is operational.

Even if the controller was not operational and is incapable of being bypassed, a beacon would be coming in but the controller would be displaying another error code. If this happens, and the operator manually switches the prime controller off, the controller is bypassed again on the loop. The beaconing terminal $A(i)$ will see its beacon come back and $A(i)$ will be equal to $A(i)b$. The beacon terminal will then issue the message "controller down." If a backup controller is present, it will see the message and assume prime controller function by starting to poll. When it does, system recovery occurs. Thus, the various contingencies for operation are covered and most probable failures will result in automatic recovery.

The present invention also covers the situation where an operator manually switches the system from the active controller to the backup controller. In this mode the operator of the system uses the active controller keyboard to key in the following message: "SWITCH BU". This message establishes the following sequence of events which are under the program control.

1. The active controller recognizes the message, handles all the responses to the current poll in process, and when end of poll is detected from the loop, the active controller stops polling and puts itself in standby mode.
2. The loop terminals see the polls stop, go through a timeout waiting for a poll, and start the beacon after going through a wrap test to assure that they are functional. Each terminal compares its receive beacon address to its own address. If its address is larger, it continues to beacon. If its address is smaller, it stops beaconing. The end result of the closed loop is that only the largest address terminal continues to beacon. When it sees its own address come back, it will send out the special beacon saying the controller is down. The controller that was active was going to be dormant and receive its first poll after the message "SWITCH BU" was entered at its keyboard. Therefore, the controller that was on backup status will see the "controller down" message and go to active status with its first action being to issue a poll.
3. The terminals now see a poll and can go back on line with the new active controller. The system is now in operation with the former backup controller now the active controller.

While the invention has been particularly shown and described with reference to the preferred embodiments thereof, it will be understood by those skilled in the art that various changes in form and details may be made therein without departing from the spirit and scope of the invention.

Having thus described our invention, what we claim as new, and desire to secure by Letters Patent is:

1. In a data transmission system having a plurality of terminal stations serially connected to a loop communications media and at least one control station connected to the loop and in series with the terminal stations, a method for determining and broadcasting a fault condition in said system comprising the steps of:
   at the control station
   (a) generating and transmitting a first control message operable for initiating a predetermined sequence of events in terminal stations connected to said serial loop;
   at each active terminal station
   (b) monitoring the loop for detecting said first control message;
   (c) for active terminal stations not receiving the first control message, generating and transmitting a second control message having an indicia for identifying an issuing terminal station;
   (d) monitoring the loop and receiving the second control message;
   (e) examining the received second control message and if the indicia in said received second control message and the indicia of the receiving terminal station satisfy a predetermined criteria retransmitting the second control message with the indicia being that of the terminal station whose indicia satisfies the criteria;
   (f) deactivating the transmitter of the terminal station of step (e) only if the stations indicia was not in a retransmitted second control message;
   (g) repeating steps (d-f) at all terminal stations downstream from the terminal station in step (e); and
   (h) issuing a third control message indicating the presence of a fault in said communications system from the terminal station whose indicia and that of an incoming second control message satisfy the predetermined criteria.

2. The method of claim 1 further including the steps of each terminal station on said loop performing a self-test prior to step (c) and generating and transmitting the second control message only if the self-test shows that the terminal station is operable.

3. The method of claim 1 further including the step of utilizing the third control message after it is issued in step (h) to activate a secondary controller connected to said loop communications media.

4. The method recited in claim 1 wherein the third control message issued in step (h) carries a unique code indicating that the controller is defective.

5. The method set forth in claim 1 wherein the indicia for identifying an issuing terminal station includes the address of said issuing terminal station.

6. The method set forth in claim 5 wherein the predetermined criteria is that the high order address between the addresses in the received second control message and a receiving station be included in the retransmitted second control message.

7. The method set forth in claim 5 wherein the predetermined criteria is that the lower order address between the addresses in the received second control message and a receiving station be included in the retransmitted second control message.

8. In a serial loop communications system wherein a plurality of stations are connected in series to a looped communications medium a method for isolating faults on said loop comprising the steps of:
   (a) generating and transmitting on the loop a first control message operable for enabling active stations on said loop to communicate with a controller;
   (b) at each active station on the loop; monitoring the loop for detecting said first control message;
   (c) initiating a procedure for testing the operability of said stations only if the first signal is not detected;
   (d) generating and transmitting on said loop a second control message only if a station passes the self-test procedure of step (c) with the second control message carrying an address for the station;
   (e) receiving the second control message at each downstream station;
   (f) comparing the address in an incoming second control message with the station's address for determining a high order address;
   (g) forwarding the second control message with the high order address;
   (h) inhibiting a station from further issuing messages only if its address was not in the second control message of step (g); and
   (i) repeating steps (f) through (i) sequentially for each active station on the loop until only the station having the high order address continues to issue the second control message.

9. The method recited in claim 8, further including the steps of monitoring the ring with the high order address station to detect the second control message;
   comparing a address in the received second control message with the address assigned to said station; and
   issuing a third message indicating that the controller is inoperative only if the address matches.

10. In a serial loop communications system wherein a plurality of stations are connected in series to a looped communications medium a method for isolating faults on said loop comprising the steps of:
   (a) generating and transmitting on the loop a first control message operable for enabling active stations on said loop to communicate with a controller;
   (b) at each active station on the loop, monitoring the loop for detecting said first control message;
   (c) initiating a procedure for testing the operability of said stations only if the first signal is not detected;
   (d) generating and transmitting on said loop a second control message only if a station passes the self-test procedure of step (c);
   (e) receiving the second control message at each downstream station;
   (f) comparing the address in an incoming second control message with the station's address;
   (g) forwarding the incoming second control message only if the incoming address is larger than the station's address;
   (h) inhibiting a station from further issuing messages once step (g) is completed;
   (i) repeating steps (f) through (i) sequentially for each active station on the loop until only the station not receiving an incoming message continues to issue the second control message.

* * * * *